United States Patent
Boyd et al.

(10) Patent No.: US 7,492,723 B2
(45) Date of Patent: Feb. 17, 2009

(54) MECHANISM TO VIRTUALIZE ALL ADDRESS SPACES IN SHARED I/O FABRICS

(75) Inventors: William T. Boyd, Poughkeepsie, NY (US); Douglas M. Freimuth, New York, NY (US); William G. Holland, Cary, NC (US); Steven W. Hunter, Raleigh, NC (US); Renato J. Recio, Austin, TX (US); Steven M. Thurber, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 11/176,922

(22) Filed: Jul. 7, 2005

(65) Prior Publication Data
US 2007/0019637 A1 Jan. 25, 2007

(51) Int. Cl.
*H04L 12/50* (2006.01)
(52) U.S. Cl. .................. 370/252; 370/256; 370/423; 710/9; 710/305; 709/220
(58) Field of Classification Search .................. None
See application file for complete search history.

(56) References Cited

U.S. PATENT DOCUMENTS

| | | | |
|---|---|---|---|
| 5,257,353 A | 10/1993 | Blanck et al. | |
| 5,367,695 A | 11/1994 | Narad et al. | |
| 5,960,213 A | 9/1999 | Wilson | |
| 6,061,753 A | 5/2000 | Ericson | |
| 6,446,188 B1 * | 9/2002 | Henderson et al. | 711/206 |
| 6,662,251 B2 | 12/2003 | Brock et al. | |
| 6,769,021 B1 | 7/2004 | Bradley et al. | |
| 6,775,750 B2 | 8/2004 | Krueger | |
| 6,907,510 B2 | 6/2005 | Bennett et al. | |
| 7,036,122 B2 | 4/2006 | Bennett et al. | |
| 7,096,305 B2 | 8/2006 | Moll | |
| 7,174,413 B2 | 2/2007 | Pettey et al. | |
| 7,188,209 B2 | 3/2007 | Pettey et al. | |
| 7,194,538 B1 | 3/2007 | Rabe et al. | |

(Continued)

FOREIGN PATENT DOCUMENTS

WO 2006089914 A1 8/2006

OTHER PUBLICATIONS

U.S. Appl. No. 11/340,447, filed Jan. 26, 2006, Boyd et al.

(Continued)

*Primary Examiner*—Duc C Ho
(74) *Attorney, Agent, or Firm*—Duke W. Yee; Diana Roberts-Gerhardt; Brandon G. Williams

(57) ABSTRACT

A mechanism, method and computer usable medium is provided for each root node of a multiple root node system and its own independent address space. This mechanism also allows multiple system images within the same root node to have their own independent address spaces. A mechanism is also provided for incorporating legacy root node and input/output adapters that are non-aware of the mechanisms introduced by this invention. Input/ output adapters which implement this invention may also have the number of functions that they support greatly expanded beyond the present eight functions per input/output adapter.

1 Claim, 10 Drawing Sheets

U.S. PATENT DOCUMENTS

| | | | |
|---|---|---|---|
| 7,243,167 B2 * | 7/2007 | Zimmer et al. | 710/10 |
| 2002/0188701 A1 | 12/2002 | Brown et al. | |
| 2003/0221030 A1 | 11/2003 | Pontius et al. | |
| 2004/0039986 A1 | 2/2004 | Solomon et al. | |
| 2004/0123014 A1 | 6/2004 | Schaefer et al. | |
| 2004/0172494 A1 | 9/2004 | Pettey et al. | |
| 2004/0210754 A1 | 10/2004 | Barron et al. | |
| 2004/0230709 A1 | 11/2004 | Moll | |
| 2004/0230735 A1 | 11/2004 | Moll | |
| 2005/0025119 A1 | 2/2005 | Pettey et al. | |
| 2005/0044301 A1 | 2/2005 | Vasilevsky et al. | |
| 2005/0102682 A1 | 5/2005 | Shah et al. | |
| 2005/0147117 A1 | 7/2005 | Pettey et al. | |
| 2005/0188116 A1 | 8/2005 | Brown et al. | |
| 2005/0228531 A1 | 10/2005 | Genovker et al. | |
| 2005/0270988 A1 | 12/2005 | DeHaemer | |
| 2006/0168361 A1 | 7/2006 | Brown et al. | |
| 2006/0174094 A1 | 8/2006 | Lloyd et al. | |
| 2006/0179195 A1 | 8/2006 | Sharma et al. | |
| 2006/0179238 A1 | 8/2006 | Griswell et al. | |
| 2006/0179239 A1 | 8/2006 | Frey et al. | |
| 2006/0179265 A1 | 8/2006 | Flood et al. | |
| 2006/0179266 A1 | 8/2006 | Flood et al. | |
| 2006/0184711 A1 | 8/2006 | Pettey et al. | |
| 2006/0184767 A1 | 8/2006 | Le et al. | |
| 2006/0184768 A1 | 8/2006 | Bishop et al. | |
| 2006/0184769 A1 | 8/2006 | Floyd et al. | |
| 2006/0184770 A1 | 8/2006 | Bishop et al. | |
| 2006/0184946 A1 | 8/2006 | Bishop et al. | |
| 2006/0195617 A1 | 8/2006 | Arndt et al. | |
| 2006/0195619 A1 | 8/2006 | Arndt et al. | |
| 2006/0195634 A1 | 8/2006 | Arndt et al. | |
| 2006/0195642 A1 | 8/2006 | Arndt et al. | |
| 2006/0195644 A1 | 8/2006 | Arndt et al. | |
| 2006/0195663 A1 | 8/2006 | Arndt et al. | |
| 2006/0195673 A1 | 8/2006 | Arndt et al. | |
| 2006/0195848 A1 | 8/2006 | Arndt et al. | |
| 2006/0206655 A1 | 9/2006 | Chappell et al. | |
| 2006/0206936 A1 | 9/2006 | Liang et al. | |
| 2006/0209863 A1 | 9/2006 | Arndt et al. | |
| 2006/0212608 A1 | 9/2006 | Arndt et al. | |
| 2006/0212620 A1 | 9/2006 | Arndt et al. | |
| 2006/0212870 A1 | 9/2006 | Arndt et al. | |
| 2006/0224790 A1 | 10/2006 | Arndt et al. | |
| 2006/0230181 A1 | 10/2006 | Riley | |
| 2006/0230217 A1 | 10/2006 | Moll | |
| 2006/0242333 A1 | 10/2006 | Johnsen et al. | |
| 2006/0242352 A1 | 10/2006 | Torudbakken et al. | |
| 2006/0242354 A1 | 10/2006 | Johnsen et al. | |
| 2006/0253619 A1 | 11/2006 | Torudbakken et al. | |
| 2006/0271820 A1 | 11/2006 | Mack et al. | |
| 2007/0027952 A1 | 2/2007 | Boyd et al. | |
| 2007/0097871 A1 | 5/2007 | Boyd et al. | |
| 2007/0097948 A1 | 5/2007 | Boyd et al. | |
| 2007/0097949 A1 | 5/2007 | Boyd et al. | |
| 2007/0097950 A1 | 5/2007 | Boyd et al. | |
| 2007/0101016 A1 | 5/2007 | Boyd et al. | |
| 2007/0136458 A1 | 6/2007 | Boyd et al. | |

OTHER PUBLICATIONS

U.S. Appl. No. 11/334,678, filed Jan. 18, 2006, Boyd et al.
U.S. Appl. No. 11/348,903, filed Feb. 7, 2006, Boyd et al.
U.S. Appl. No. 11/567,425, filed Dec. 6, 2006, Boyd et al.
U.S. Appl. No. 11/351,020, filed Feb. 9, 2006, Boyd et al.
U.S. Appl. No. 11/567,411, filed Dec. 6, 2006, Boyd et al.

* cited by examiner

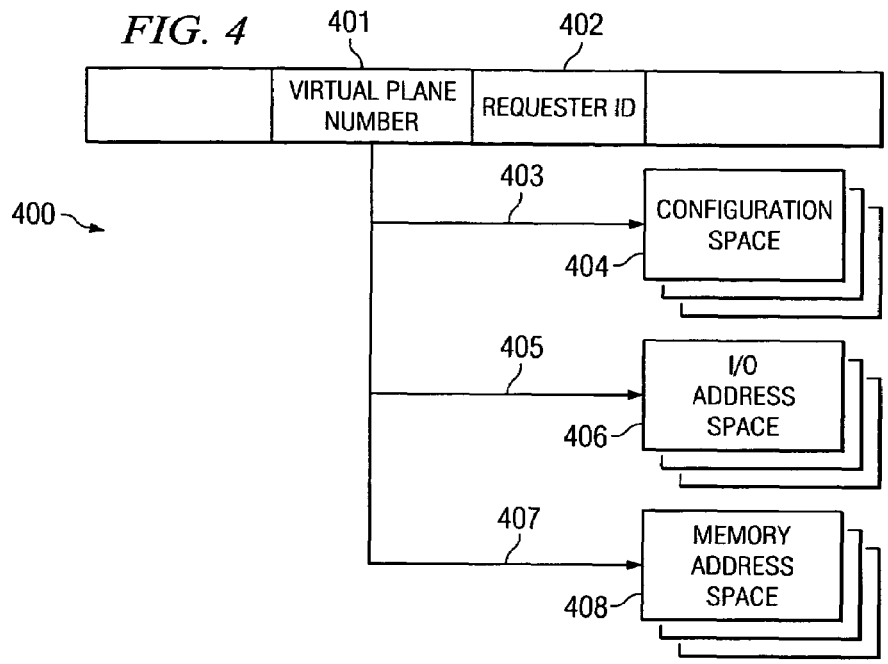
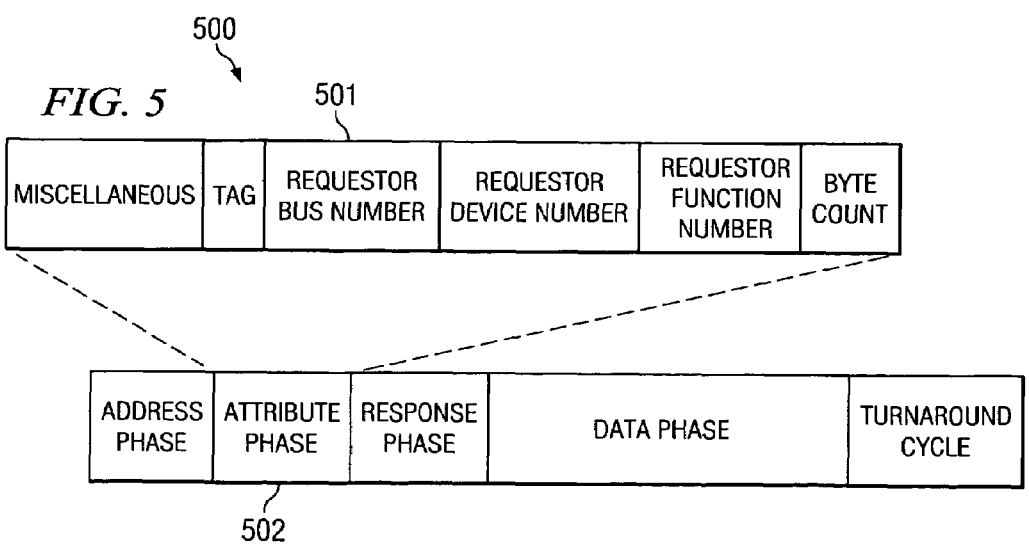

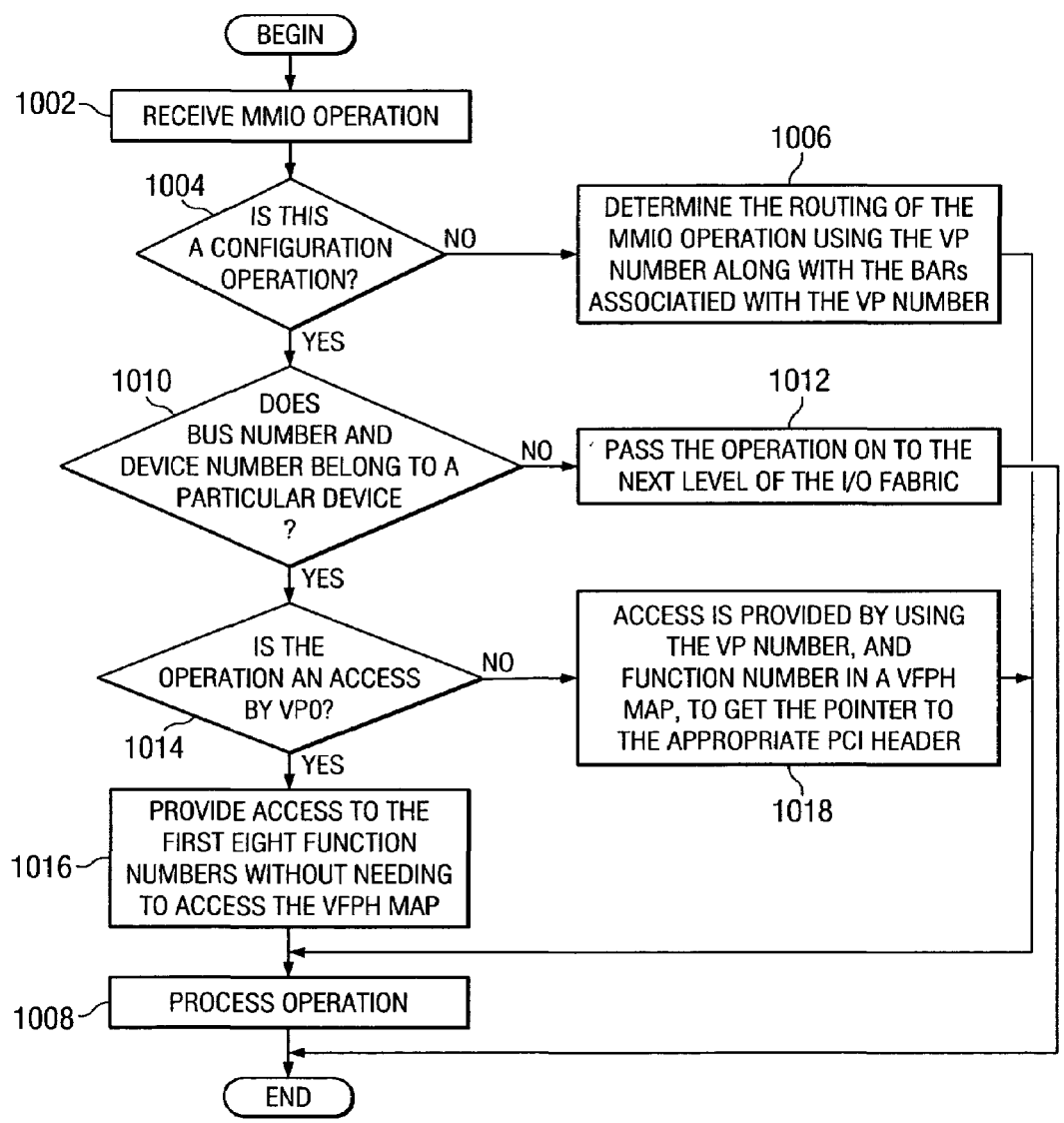

MECHANISM TO VIRTUALIZE ALL ADDRESS SPACES IN SHARED I/O FABRICS

BACKGROUND OF THE INVENTION

1. Field of the Invention

The present invention relates generally to communications between a host computer and an input/output adapter through an input/output fabric. More specifically, the present invention addresses where the input/output fabric is attached to more than one root node and where each root may potentially share with the other roots the input/output adapter.

2. Description of the Related Art

Standard peripheral component interconnect (PCI), and similar I/O fabric technologies, share one address space among the various root nodes, in a configuration with a plurality of root nodes, because no mechanism has been identified to separate the address spaces into independent address and configuration spaces. Thus, each root node has to be aware of the other root nodes' spaces, and not impinge on them. This is a problem with standard PCI configuration software, as they do not generally have this knowledge, and so such implementations will not work with current software, and in particular, existing configuration software. Furthermore, the concepts of logically partitioned systems are that the address spaces of partitions should be configurable so that they do not overlap, so that partitions may be kept independent, and no mechanism exist to do that today in the multi-root environment.

Thus it would be advantageous to provide a fully independent address and configuration space for each root node and for each partition or system image within a root node, so that existing software works and so that systems may be partitioned.

SUMMARY OF THE INVENTION

The present invention provides a mechanism, method and computer usable medium for providing each root node of a multiple root node system, its own independent address space. This same mechanism will also allow multiple system images within the same root node to have their own independent address spaces, and will allow for other mechanisms tied to the address spaces like buffers, caches, and address translation mechanisms, to be kept separate. This invention further provides a mechanism for incorporating legacy root node and input/output adapters that are non-aware of the mechanisms introduced by this invention. Input/output adapters which implement this invention may also have the number of functions that they support greatly expanded beyond the present eight functions per input/output adapter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts the necessary components needed to add to an I/O transaction to implement VPs in accordance with an illustrative embodiment of the present invention;

FIG. 5 depicts a more detailed description of the content of a PCI-X transaction in accordance with an illustrative embodiment of the present invention;

FIG. 10 depicts a flowchart for the operation of a Memory Mapped I/O (MMIO) operation is depicted in accordance with an illustrative embodiment of the present invention;

DETAILED DESCRIPTION OF THE PREFERRED EMBODIMENT

The aspects of the present invention apply to any general or special purpose computing system where multiple root complexes (RCs) are sharing a pool of input/output adapters (IOAs) through a common input/output (I/O) fabric. More specifically, an illustrative embodiment describes the addresses where the I/O fabric is attached to more than one root node and where each root may potentially share with the other roots the I/O adapter (IOA). In particular, the present invention provides a mechanism by which each root node, or logical partition within a root node, is given its own separate address space and configuration space, such that each root node, or logical partition within a root node, thinks it has its own independent I/O fabric. In particular, the present invention specifically addresses the distributed computing system which uses the peripheral component interconnect (PCI) extended (PCI-X) or PCI Express protocol to communicate over the I/O fabric.

Figure 1:
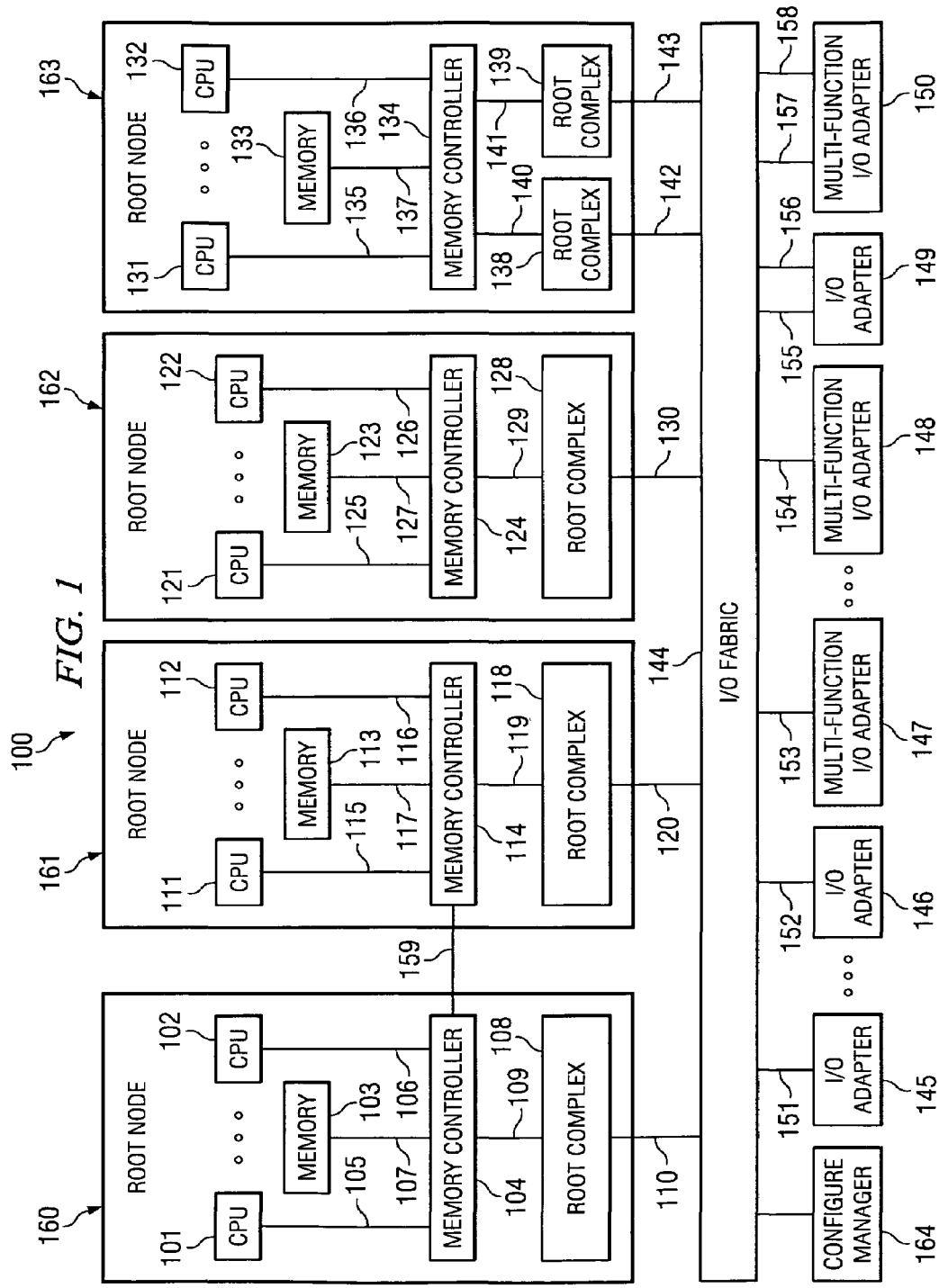
FIG. 1 depicts a distributed computing system in accordance with an illustrative embodiment of the present invention.

With reference now to the figures and in particular with reference to FIG. 1, a diagram of a distributed computing system is illustrated in accordance with an illustrative embodiment of the present invention. Distributed computer system 100 represented in FIG. 1 takes the form of one or more root complexes 108, 118, 128, 138, and 139, attached to I/O fabric 144 through I/O links 110, 120, 130, 142, and 143, and to memory controllers 104, 114, 124, and 134 of root nodes (RNs) 160, 161, 162, and 163. I/O fabric 144 is attached to IOAs 145, 146, 147, 148, 149, and 150 through links 151, 152, 153, 154, 155, 156, 157, and 158. IOAs 145, 146, 147, 148, 149, and 150 may be single function IOAs such as in 145, 146, and 149, or multiple function IOAs such as in 147, 148, and 150. Further, IOAs 145, 146, 147, 148, 149, and 150 may be connected to I/O fabric 144 via single links as in 145, 146, 147, and 148 or with multiple links for redundancy as in 149 and 150.

Root complexes 108, 118, 128, 138, and 139 are part of root nodes 160, 161, 162, and 163. More than one root complex per root node may be present as in root node 163. In addition to the root complexes, each root node consists of one or more central processing units (CPUs) 101, 102, 111, 112, 121, 122, 131, and 132, memory 103, 113, 123, and 133, memory controller 104, 114, 124, and 134 which connects CPUs 101, 102, 111, 112, 121, 122, 131, and 132, memory 103, 113, 123, and 133, and I/O root complexes 108, 118, 128, 138, and 139 and performs such functions as handling the coherency traffic for the memory.

Root nodes 160 and 161 may be connected together at connection 159 through their memory controllers 104 and 114 to form one coherency domain and which may act as a single symmetric multi-processing (SMP) system, or may be independent nodes with separate coherency domains as in root nodes 162 and 163.

Configuration manager 164 may be attached separately to I/O fabric 144 or may be part of one or more of the root nodes 160, 161, 162, and 163. Configuration manager 164 configures the shared resources of I/O fabric 144 and assigns resources to root nodes 160, 161, 162, and 163.

Distributed computing system 100 may be implemented using various commercially available computer systems. For example, distributed computing system 100 may be implemented using an IBM eServer™ iSeries® Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
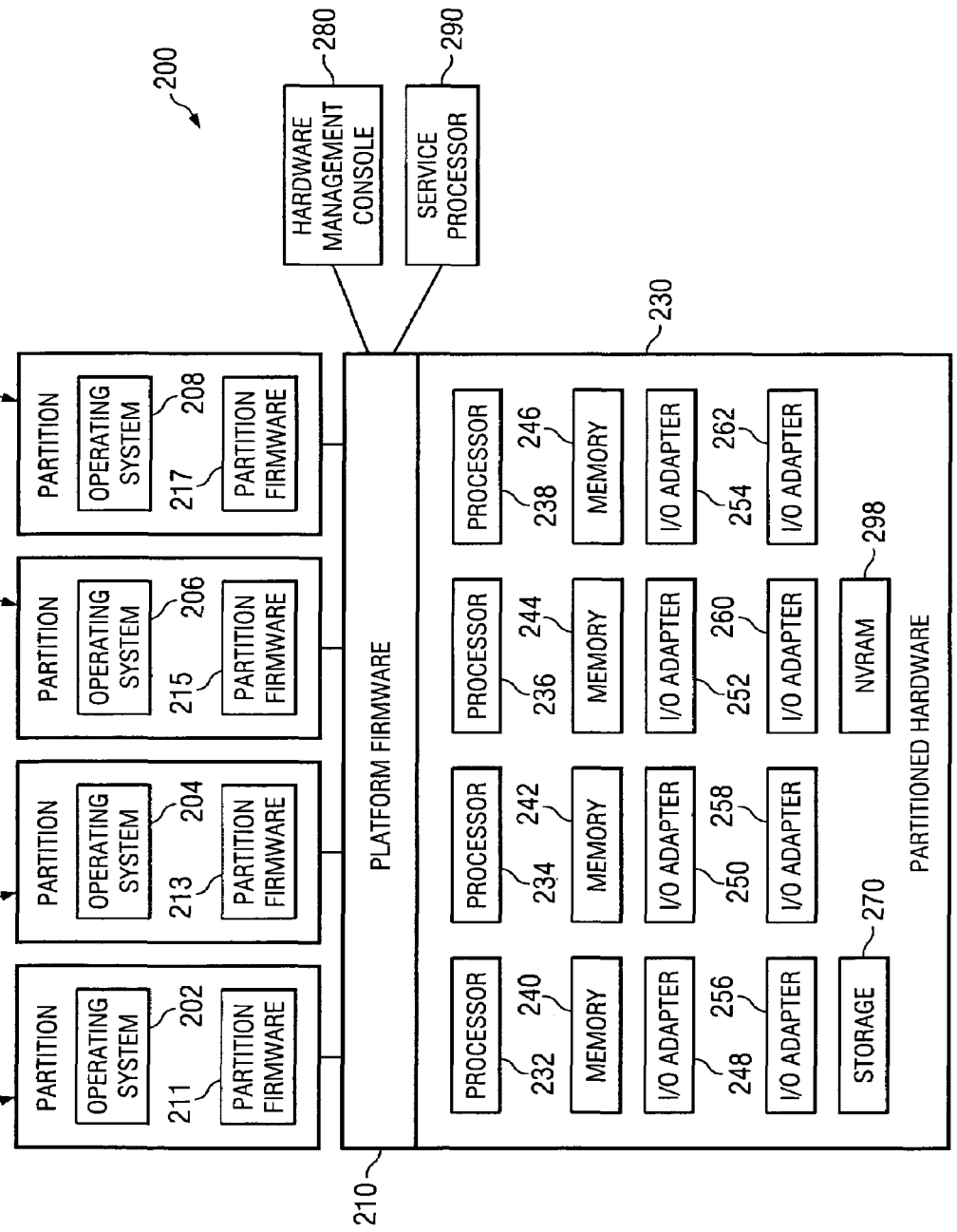
FIG. 2 depicts a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, distributed computing system 100 in FIG. 1. Logical partitioned platform 200 includes partitioned hardware 230, operating systems 202, 204, 206, and 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Other types of operating systems, such as AIX® and Linux, may also be used depending on the particular implementation.

Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (NVRAM).

Additionally, partitions 203, 205, 207, and 209 also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and runtime abstraction software. The processors associated or assigned to partitions 203, 205, 207, and 209 are then dispatched to the partition's memory to execute partition firmware 211, 213, 215, and 217.

Partitioned hardware 230 includes a plurality of processors 232, 234, 236, and 238, a plurality of system memory units 240, 242, 244, and 246, a plurality of IOAs 248, 250, 252, 254, 256, 258, 260, and 262, storage unit 270, and non-volatile random access memory storage 298. Each of the processors 232, 234, 236, and 238, memory units 240, 242, 244, and 246, non-volatile random access memory storage 298, and IOAs 248, 250, 252, 254, 256, 258, 260, and 262, or parts thereof, may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent operating system images 202, 204, 206, and 208 by virtualizing the hardware resources of logical partitioned platform 200.

Service processor 290 may be used to provide various services, such as processing of platform errors in partitions 203, 205, 207, and 209. These services also may act as a service agent to report errors back to a vendor, such as International Business Machines Corporation. Operations of partitions 203, 205, 207, and 209 may be controlled through a hardware management console, such as hardware management console 280. Hardware management console 280 is a separate distributed computing system from which a system administrator may perform various functions including reallocation of resources to different partitions. Operations which may be controlled include things like the configuration of the partition relative to the components which are assigned to the partition, whether the partition is running or not.

In a logical partitioning (LPAR) environment, it is not permissible for resources or programs in one partition to affect operations in another partition. Furthermore, to be useful, the assignment of resources needs to be fine-grained. For example, it is often not acceptable to assign all IOAs under a particular PCI Host Bridge (PHB) to the same partition, as that will restrict configurability of the system, including the ability to dynamically move resources between partitions.

Accordingly, some functionality is needed in the bridges that connect IOAs to the I/O bus so as to be able to assign resources, such as individual IOAs or parts of IOAs to separate partitions; and, at the same time, prevent the assigned resources from affecting other partitions such as by obtaining access to resources of the other partitions.

Figure 3:
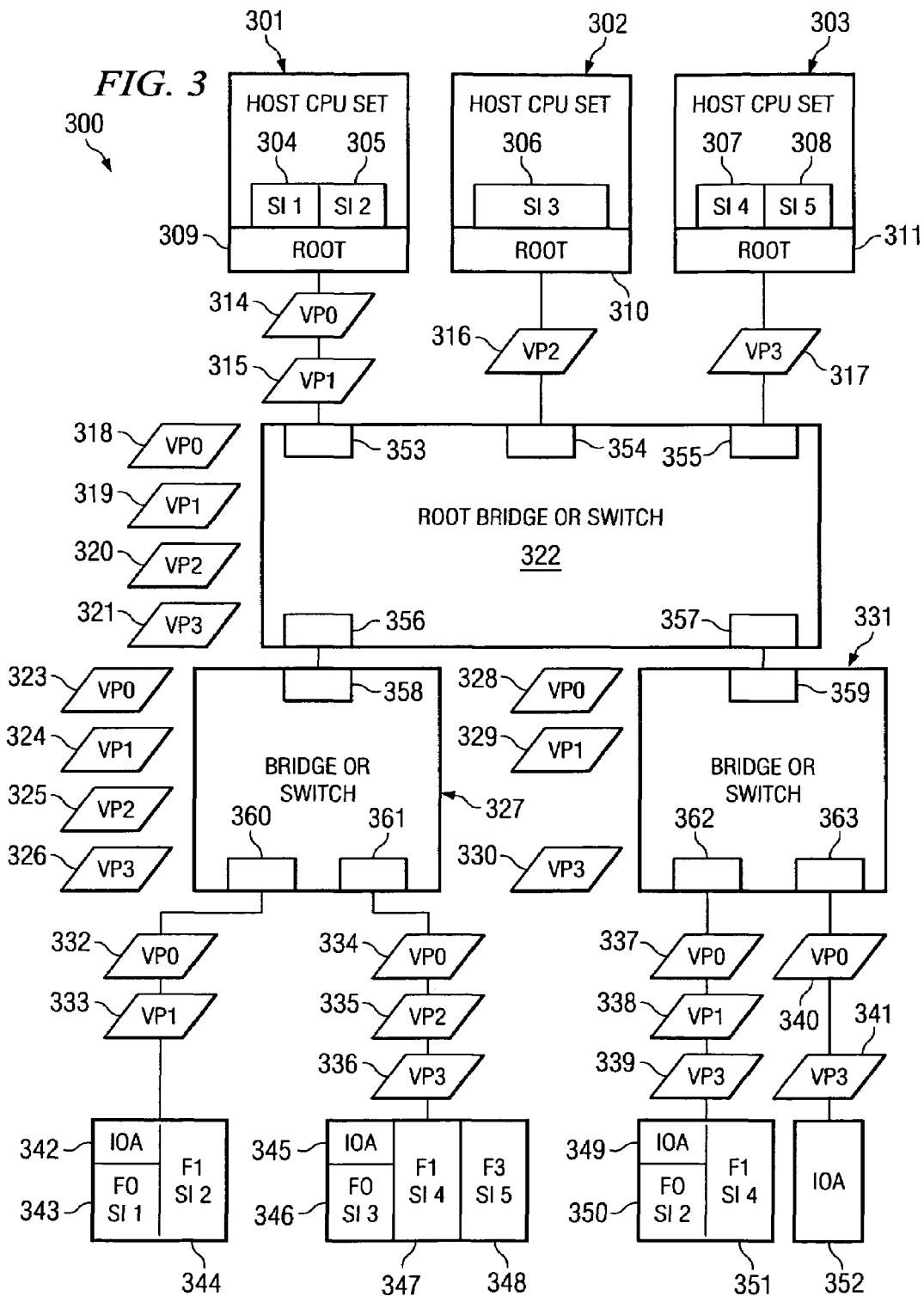
FIG. 3 depicts the concept of virtual planes in accordance with an illustrative embodiment of the present invention.

With reference now to FIG. 3, the concept of virtual planes (VPs) is depicted in accordance with an illustrative embodiment of the present invention. The configuration of VPs 300 consists of a single or plurality of host CPU sets 301, 302 and 303, each containing a single or plurality of system images (SIs) 304, 305, 306, 307, and 308. System images 304, 305, 306, 307, and 308 then interface to the I/O fabric through their root complexes 309, 310, and 311. A particular host CPU set along with the corresponding root complex will be referred to the root node.

Each root node is connected to one of root ports 353, 354, and 355 of root bridge or switch 322. Root bridge or switch 322, by way of this invention, provides each root node with its own virtualized address spaces or VPs 315, 316, and 317. In addition, a single or plurality of root ports will provide access to VP number 0 (VP0) 314. VP0 314 is a unique address plane, which is used to access the configuration mechanism described in this invention. VP0 is unique in that it is accessible to only the root nodes which are allowed to configure the VPs of the fabric, and because the components of the configuration 300 use the occurrence of the VP number in the operation to allow access to the VP configuration mechanism defined in this invention. Granting of access to VP0 314 to a root node is by a mechanism outside the scope of this invention and is given to the trusted root node or nodes in the system, wherein trusted is used to mean that the software contained therein which accesses VP0 314 has been designed and tested to standards that prevents accidental or intentional sharing of address spaces between VPs 315, 316, and 317 or the assignment of more than one root node to a VP, unless that sharing is specifically requested and allowed by administrative policy.

Root bridge or switch 322 root ports coalesce the VPs 314, 315, 316, and 317 of the root nodes above it, and therefore this root bridge or switch 322 has resources within it that deal with VP0 318, VP1 319, VP2 320, and VP3 321. Root bridge or switch 322 is then attached via its secondary ports 356 and 357 to the rest of the I/O fabric. In particular, port 356 is connected to port 358 of bridge or switch 327 and port 357 is connected to port 359 of bridge or switch 331.

Bridge or switch 327 is then connected via secondary port 360 to I/O adapter (IOA) 342 and bridge or switch 327 and is also connected via secondary port 361 to IOA 345. In a similar manner, bridge or switch 331 is connected via secondary port 362 to I/O adapter (IOA) 349 and is also connected via secondary port 363 to IOA 352.

IOA 342 is shown as a virtualized IOA with function 0 (F0) 343 assigned to system image 1 (SI1) 304, and function 1 (f1) 344 assigned and accessible to SI2 305. Since host CPU set 301 contains images SI1 304 and SI2 305 and since this root node has access to VP1 315, therefore IOA 342 is assigned to have access to VP1 333. In addition, the host CPU sets which are given access to VP0 314, in this case host CPU set 301, will also have access to the VP0 address space 332 of IOA 342.

In a similar manner, IOA 345 is shown as a virtualized IOA with function 0 (F0) 346 assigned and accessible to SI3 306, function 1 (F1) 347 assigned and accessible to SI4 307, and function 3 (F3) 348 assigned to SI5 308. Since host CPU sets 302 and 303 contains images SI3 306, SI4 307, and SI5 308 and since these root nodes have access to VP2 316 and VP3 317, therefore IOA 345 is assigned to have access to VP2 335 and VP3 336. In addition, the host CPU sets which are given access to VP0 314, in this case host CPU set 301, will also have access to the VP0 address space 334 of IOA 345.

Since bridge or switch 327 services VP0 314, 332 and 334, VP1 333, VP2 335, and VP3 336, it must contain resources within it to deal with VP0 323, VP1 324, VP2 325, and VP3 326.

IOA 349 is shown as a virtualized IOA with F0 350 assigned and accessible to SI2 305, and F1 351 assigned and accessible to SI4 307. Since host CPU set 301 contains images SI2 305 and since this root node has access to VP1 315 and since host CPU set 303 contains image SI4 307 and this root node has access to VP3 317, therefore IOA 342 is assigned to have access to VP1 333 and VP3 339. In addition, the host CPU sets which are given access to VP0 314, in this case host CPU set 301, will also have access to the VP0 address space 337 of IOA 349.

IOA 352 is shown as a single function IOA assigned and accessible to SI5 308. Since host CPU set 303 contains system images SI4 307 and SI5 308, and since this root node has access to VP3 317, therefore IOA 352 is assigned to have access to VP3 341. In addition, the host CPU sets which are given access to VP0 314, in this case host CPU set 301, will also have access to the VP0 address space 340 of IOA 352.

Since bridge or switch 331 services VP0 314, 337 and 340, VP1 338, and VP3 339 and 341, it must contain resources within it to deal with VP0 328, VP1 329, and VP3 330.

For greatest flexibility, all components in the I/O fabric including root complexes, bridges, switches, and IOAs will participate implement VPs. Later a mechanism will be shown to allow legacy root complexes and IOAs, which do not implement VPs, to be incorporated into the I/O fabric.

Turning now to FIG. 4, the necessary components needed to add to an I/O transaction to implement VPs is depicted in accordance with an illustrative embodiment of the present invention. This description applies to I/O fabrics which implement I/O transactions 400 whose source is tagged with a requester ID 402. PCI-X and PCI Express are examples of such fabrics which contain requester ID 402 attached to each I/O transaction 400. This description defines an additional field, VP field 401, that defines which VP to access. Requestor ID 402 and VP 401 are assigned by the configuration program, which is a trusted program, at fabric configuration times, and is remembered by the hardware and automatically appended by the hardware on each I/O transaction. It should be noted that it is possible to redefine a few of the bits in an existing definition of a requester ID to use as a VP field. For example, in PCI fabrics, requestor ID 402 consists of a bus number, device number, and function number. For implementations of this invention that require only a few VPs, one could use one or two bits of the bus number field to implement the VP field.

VP field 401 is then used to access a separate set of configuration address spaces 404 via connection 403, one set for each VP, in the I/O fabric devices like bridges, switches, and IOAs. Likewise, VP field 401 is used to access a separate I/O address space 406 via connection 405 per VP and to access a separate memory address space 408 via connection 407 per VP.

FIG. 5 depicts a more detailed description of the content of a PCI-X transaction in accordance with an illustrative embodiment of the present invention. PCI-X transaction 500, shows bus number field 501, which is contained in the attribute phase 502 of the transaction. The present invention may be implemented in PCI-X systems by using a few of these bus number field 501 bits or by defining a separate field.

Figure 6:
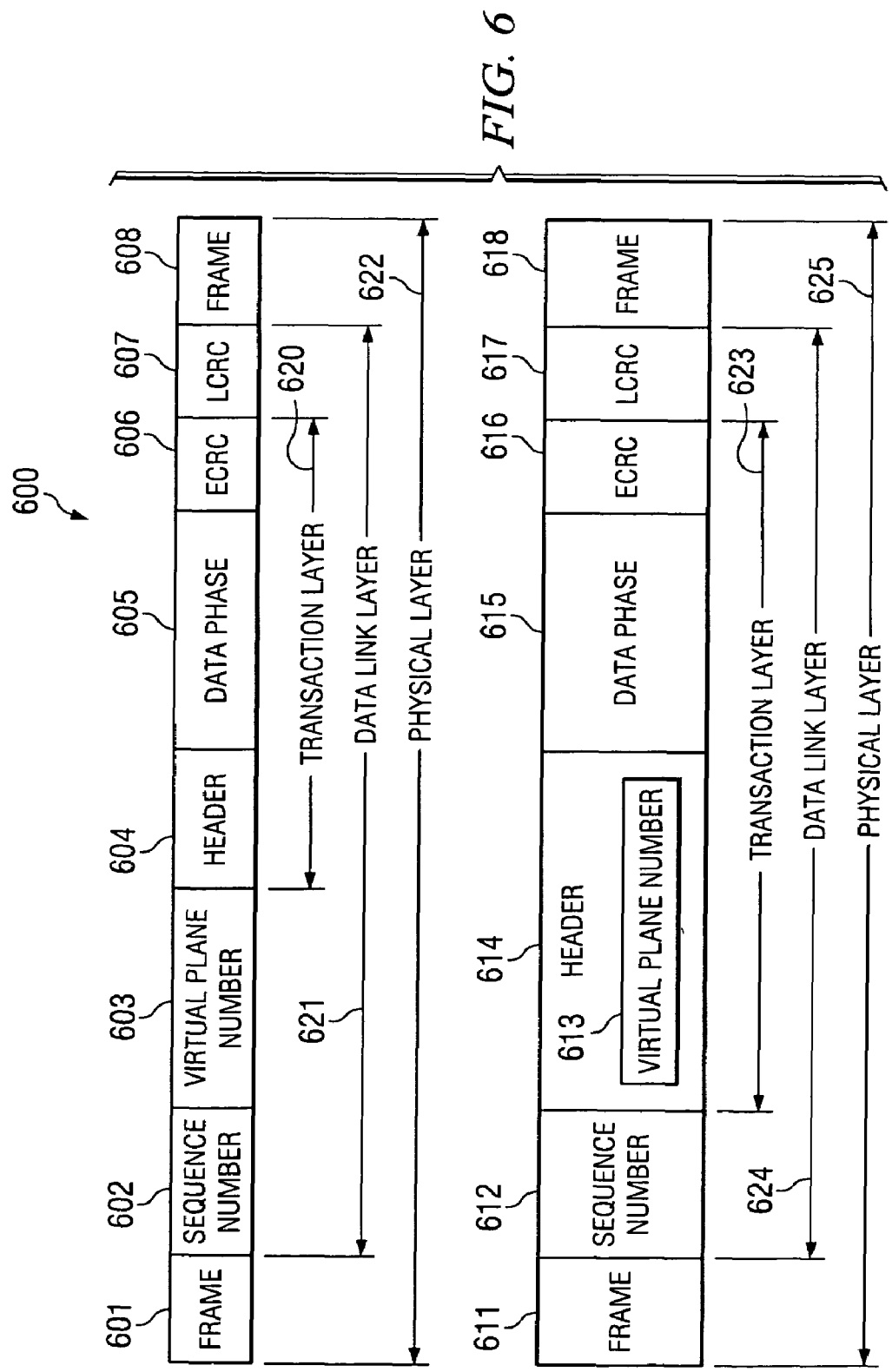
FIG. 6 depicts a more detailed description of the content of a PCI Express transaction in accordance with an illustrative embodiment of the present invention.

FIG. 6 depicts a more detailed description of the content of a PCI Express transaction in accordance with an illustrative embodiment of the present invention. PCI Express transaction 600 depicts how the VP number field 603 or 613 may be inserted. PCI Express transaction 600 consists of a transaction layer 620 or 623, a data link layer 621 or 624, and a physical layer 622 or 625. The fields are contained in each of layers 620, 621, 622, 623, 624, and 625 are shown by arrows in the FIG. 6.

PCI Express transaction 600 is framed by the framing field 601 and 608, or 611 and 618. The sequence number field 602 or 612 is part of the data link layer and keeps transactions in order. The header field 604 or 614 is part of the transaction layer and contains information about the transaction. The data phase 605 or 615 contains the data, when there is any, in the transaction. The end to end cyclic redundancy check (CRC) (ECRC) 606 or 616 provides an end to end check on the transaction data and header. The link CRC (LCRC) 607 or 617 provides a link level data integrity check.

The VP number field 603 may be inserted outside the transaction layer 620 or VP number field 613 may be inserted inside the transaction layer 623. In the former case, VP number field 603 will not be covered by ECRC 606 data integrity check. However, this implementation works better if heterogeneous I/O fabrics are to be allowed, such that, for example, legacy I/O adapters or legacy root nodes are to be supported. In the latter case, VP number 613 will be covered by ECRC 616, but legacy support is not possible unless ECRC 616 is recalculated by a component in the middle of the I/O fabric, which breaks the intent of the ECRC 616, which is supposed to be an end to end check.

Figure 7:
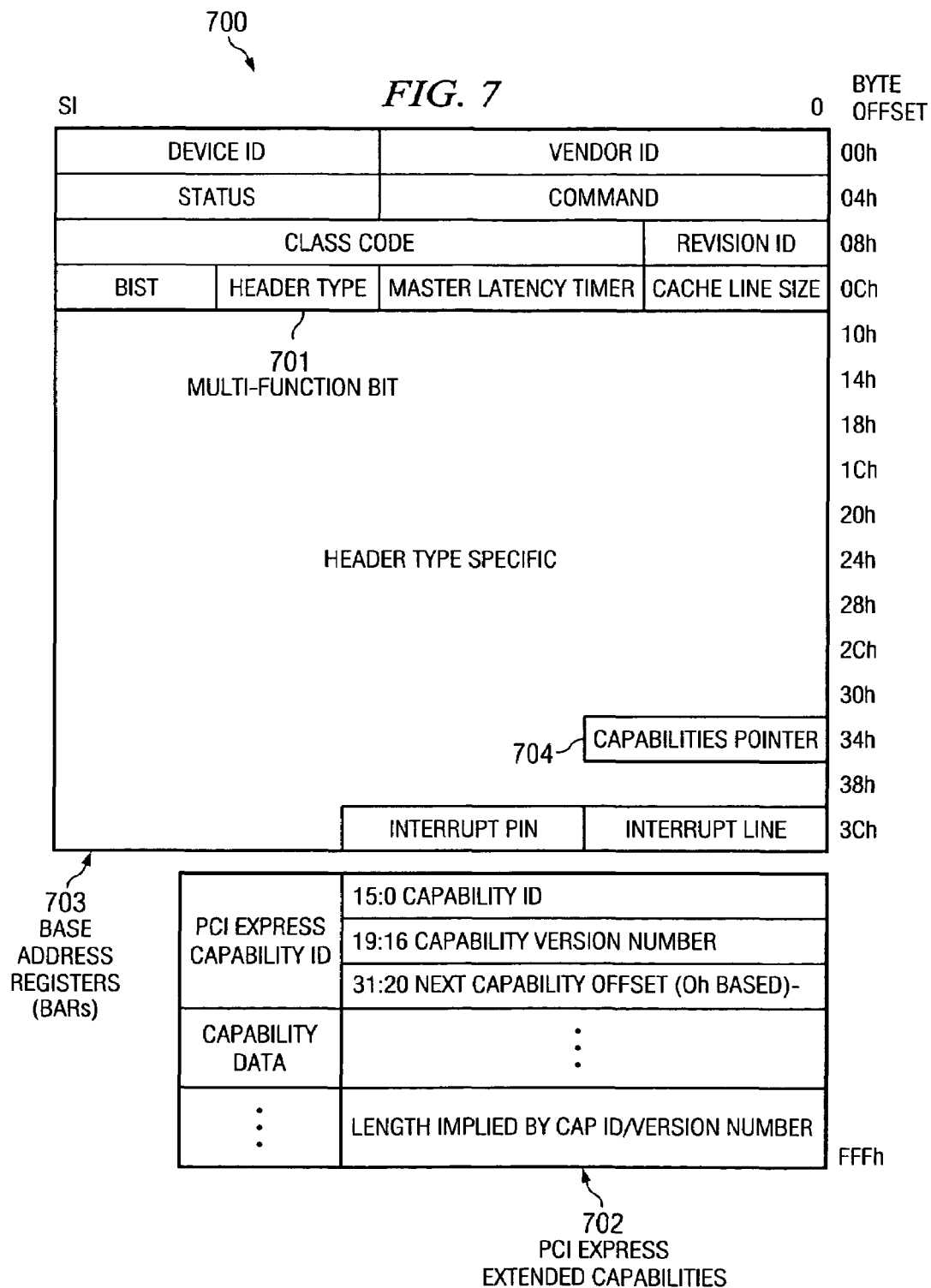
FIG. 7 depicts a PCI configuration space in accordance with an illustrative embodiment of the present invention.

FIG. 7 depicts a PCI configuration space in accordance with an illustrative embodiment of the present invention. In particular, the multifunction bit 701 is in the header type field of the PCI configuration header 700. This bit tells the configuration software whether there is more than just function 0 implemented. This bit will be adjusted based on the number of functions of the device which gets assigned to a VP. If only one function of a multifunction IOA is assigned to a particular VP, then this bit is adjusted to be a 0 (single function) when the configuration space of the IOA is accessed through that VP. Thus, the configuration software of that VP will not look for other functions on the IOA.

The base address registers (BARS) are part of the header type specific area. The base address registers determine how a specific transaction is routed through the I/O fabric. There are independent base address registers per IOA function, and therefore by setting the granularity of function to VP assignment at the function level, the base address registers for a function plus a function's VP number will define its routing for that VP number. These registers affect the routing for the I/O address space and memory address space, as shown in 406 and 408 of FIG. 4.

PCI-X uses the capabilities pointer 704 in the PCI configuration header 700 to point to new capabilities. PCI Express starts its extended capabilities 702 at a fixed address in the PCI configuration header 700. These may be used to access the VP mechanism defined by this invention. The PCI Express mechanism will be defined further here, but this invention could also be implemented via the PCI-X mechanism. The PCI Express extended capabilities 702 for the VP mechanism is only visible for modification to VP0 on physical F0 of the PCI device. It does not need to be made visible for reading for other VPs other than VP0, but blocking of reading is not required.

Figure 8:
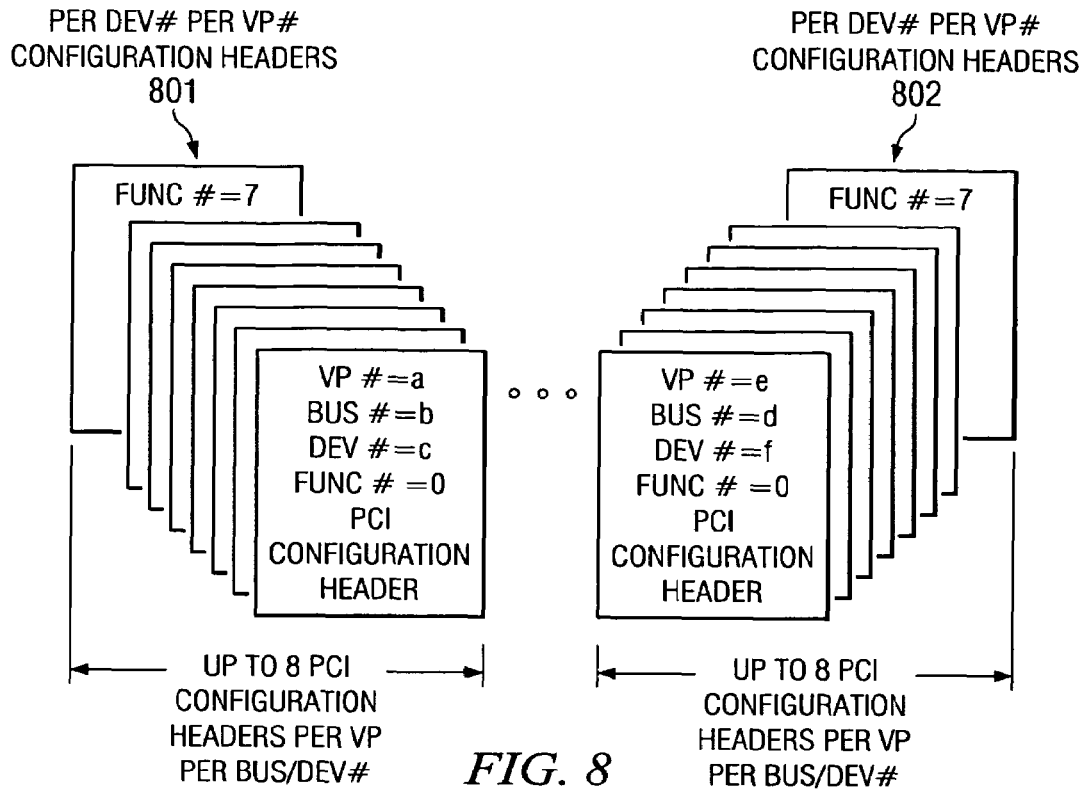
FIG. 8 depicts configuration headers in accordance with an illustrative embodiment of the present invention.

FIG. 8 depicts configuration headers in accordance with an illustrative embodiment of the present invention. The fact that for a given device number and VP number 801 or 802, that there may be up to 8 functions assigned to the VP. The definition of one mechanism to do the assignment of a physical device function to a VP is shown in FIG. 9.

Figure 9:
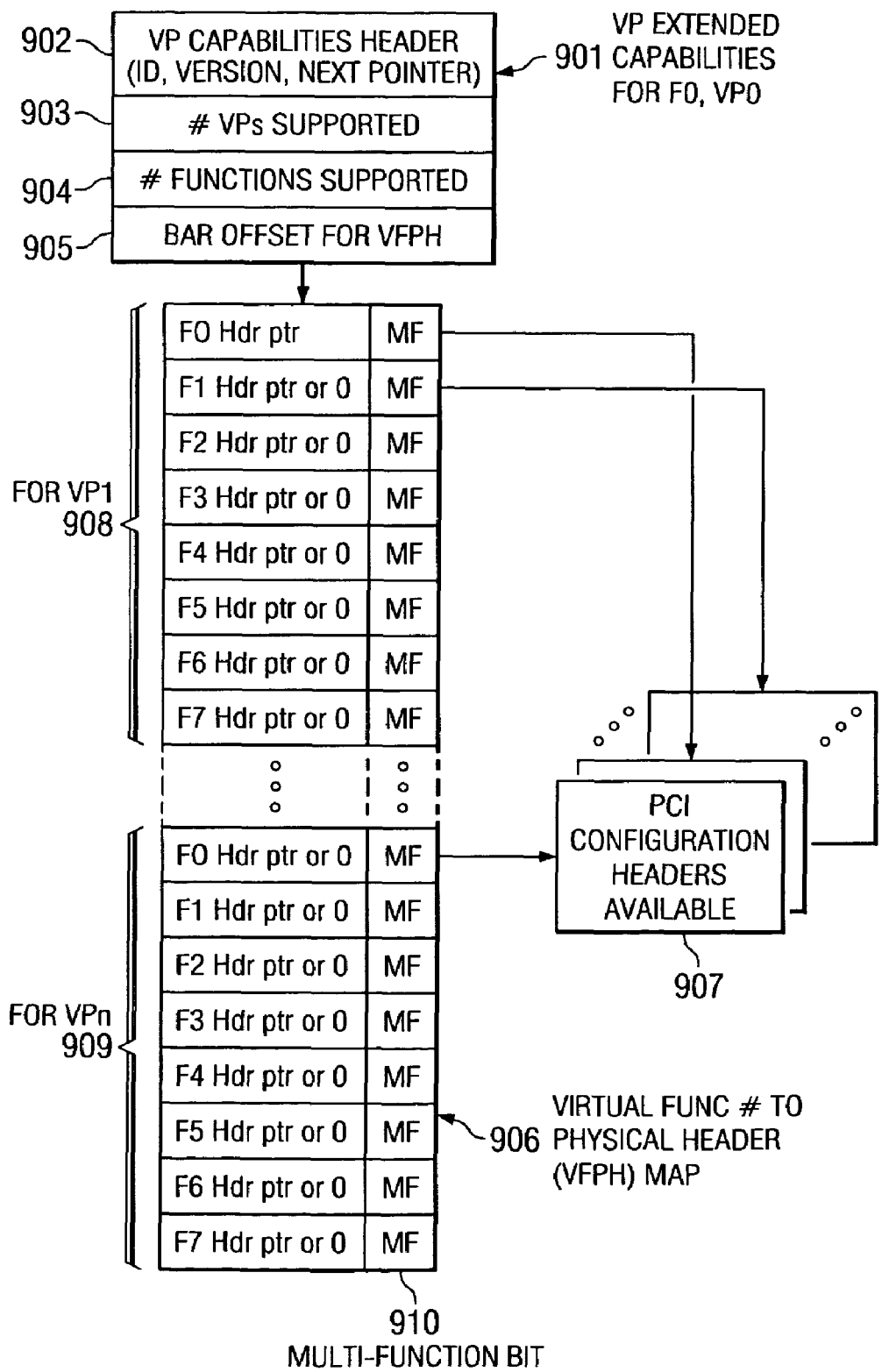
FIG. 9 depicts one exemplary embodiment for assignment of physical device functions to VPs in accordance with an illustrative embodiment of the present invention.

FIG. 9 depicts one exemplary embodiment for assignment of physical device functions to VPs in accordance with an illustrative embodiment of the present invention. The present invention makes configuration software think it has own configuration space. To do this and to allow some functions of a physical device to be assigned to one VP and others assigned to different VPs, requires a redirection mechanism for the configuration transactions, such that the function number provided by the configuration transaction on the I/O fabric gets directed to the appropriate physical device function number, and that the multifunction bit in the configuration header 701 of FIG. 7 is presented with the correct value. The PCI configuration transaction is defined by the PCI architecture.

The VP extended capabilities for F0 and VP0 901 consists of a VP capabilities header 902, as defined by the PCI architecture and with a value indicating that this is a header for VP extended capabilities. The VP extended capabilities 901 also contains the number of VPs supported 903, which tells software how many VPs that the devices functions may be assigned to. Also specified are the number of functions supported 904. Note that the number of functions supported is not limited to eight, as in the current PCI architecture, but is only limited to eight per VP supported. For example, if a device supports four VPs, then the device might support four times eight or 32 functions, and then the software may assign a full 8 functions to each VP supported by this device. VPs supported 903 and number of functions supported 904 together tell the VP configuration management software the size of the virtual function number (func#) to physical header (VFPH) map 906. The VFPH map is in the device's memory space at a starting address specified by the BAR value plus the offset specified by he BAR offset for VFPH 905. The values 902, 903, 904, and 905 are read-only and may not be modified by software. VFPH map 906, on the other hand, is intended to be written by the VP configuration software which has access to VP0, but not by any configuration software which does not have access to VP0.

The VP configuration software, through some method outside the scope of this invention, gets the information about which physical device functions are to be assigned to which VPs. The VP configuration software then writes the appropriate values into the VFPH 906 as follows. The first entry in the VFPH map is used to determine what happens to a VP1 configuration access to F0 for this device, the second entry determines what happens to a VP1 access to F1, and so on up to the eighth entry which determines what happens to a VP1 configuration access to F7. The next entry in the table starts the functions for VP2, and so on.

The entry in the VFPH map 906 which is accessed by the configuration transaction specifies which of the devices configuration headers 907 are used for that access. The number of configuration headers supported is specified by the number of functions supported entry 904 in the VP extended capabilities for F0, VP0 901. In addition, if the access is a read to the header type field, which contains the multifunction bit 701 of FIG. 7, then the multi-function (MF) bit 910 from the VFPH map 906 is inserted instead. In this manner, if the device supports fewer functions then eight times the number of VPs supported, then if only one function is provided to a VP, then the software may set the MF bit for that VP and function number in the VFPH map to 0, so that the configuration software for the VP will only see a single function device. In addition, it is possible to assign no functions from a device to a VP and this is done by the VP configuration software setting a value of 0 into the F0 through F7 entries in the VFPH map for that VP number, such as VP1 908 or VPn 909, and when an access is attempted to configure the device, the hardware sees the 0 and treats the access as though there was no device at that bus number, device number, and function number for that specific VP.

The configuration headers 907 contain the BARS 703 of FIG. 7, and so the effect of setting up the VFPH map is to associate each of the base address registers with a particular VP. The I/O device then uses this association as part of the address decode that it performs. That is, in the base PCI architecture, the address decode is just based on the addresses in the base address registers, but with VPs, the address decode is based on the address in the BAR plus the VP to which the header 907 that contains the BAR is assigned.

Turning now to FIG. 10, a flowchart for the operation of a Memory Mapped I/O (MMIO) operation is depicted in accordance with an illustrative embodiment of the present invention. As the operation begins a MMIO operation, which may be a configuration load/store, a load/store to I/O space, or a load/store to memory space, is received (step 1002) by the device and a determination is made as to whether this is a configuration transaction access or a normal MMIO operation (step 1004). If this is a normal MMIO operation, then the VP number along with the base address registers associated with the VP number are used to determine the routing of the MMIO (step 1006) and the operation is processed (step 1008), with the operation ending thereafter. Operations to process accesses to modify the VFPH map are only allowed through VP0.

Returning to step 1004, if the operation is a configuration transaction, then a determination is made as to whether the bus number and device number belong to the device processing the transaction (step 1010). If not, then pass the operation on to the next level of the I/O fabric (step 1012), with the operation ending thereafter. Returning to step 1010, if this is a configuration for the particular device, then a determination is made as to whether this is an access by VP0 (step 1014). If the access is by VP0, then access is provided to the first eight function numbers without needing to access the VFPH map (step 1016), and then operation is processed (step 1008), with the operation ending thereafter. Returning to step 1014, if the configuration access is not via VP0, then access is provided by using the VP number, and function number in a VFPH map, to get the pointer to the appropriate PCI header and, on a read of the header type field, insert the MF bit from the VFPH (step 1018). The operation is then processed (step 1008), with the operation ending thereafter.

Figure 11:
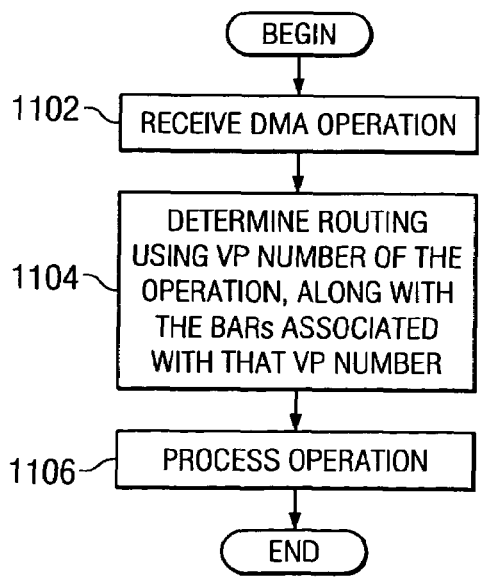
FIG. 11 depicts a flowchart detailing the processing of a DMA operation in accordance with an illustrative embodiment of the present invention.

FIG. 11 depicts a flowchart detailing the processing of a direct memory access (DMA) operation in accordance with an illustrative embodiment of the present invention. A DMA operation may include the processing of Message Signaled Interrupts (MSIs). As the operation begins a DMA operation is received (step 1102). The VP number of the operation, along with the base address registers associated with that VP number, are used to determine routing (step 1104). The operation is then processed (step 1106), with the operation ending thereafter.

Figure 12:
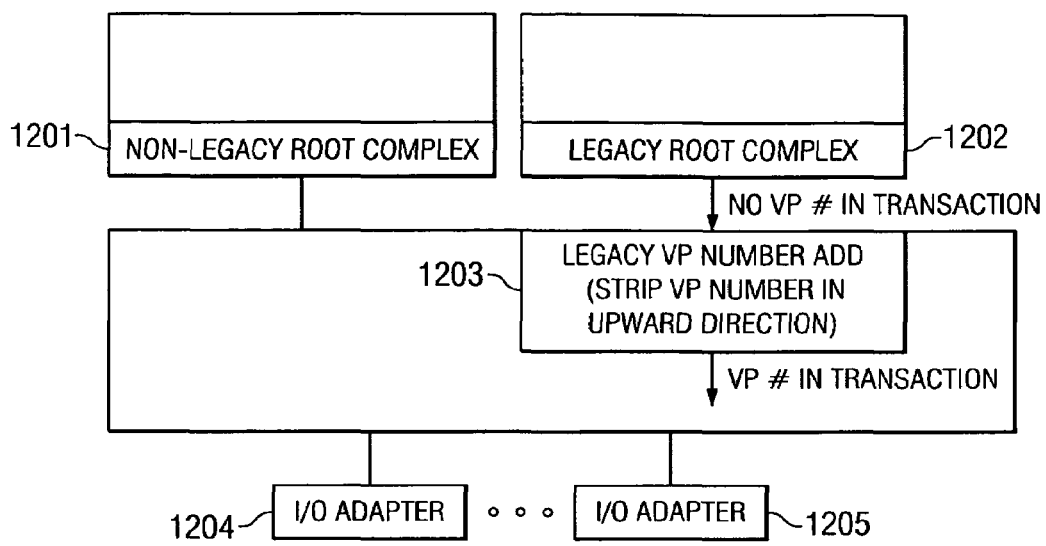
FIG. 12 depicts how a legacy root complex, which does not support VPs, may be supported in accordance with an illustrative embodiment of the present invention.

FIG. 12 depicts how a legacy root complex, which does not support VPs, may be supported in accordance with an illustrative embodiment of the present invention. In such a configuration, non-legacy root complexes 1201 that do support VPs may also be supported. Shown here, IOAs 1204 and 1205 will support VPs.

The key is that all operations from legacy root complex 1202 are assigned to the same VP number. So, as the operation from legacy root complex 1202 passes through translation logic 1203, the legacy VP number, which is held in a register in the hardware and which has been set by the same software configuration manager that assigns VP numbers to other device functions (that is, which sets up the VFPH map), gets attached to the transaction from legacy root complex 1202. In the upward direction, the transaction gets routed via the VP number and base address registers to translation logic 1203, which then proceeds to strip the VP number from the transaction before passing it on to the legacy root complex 1202.

Figure 13:
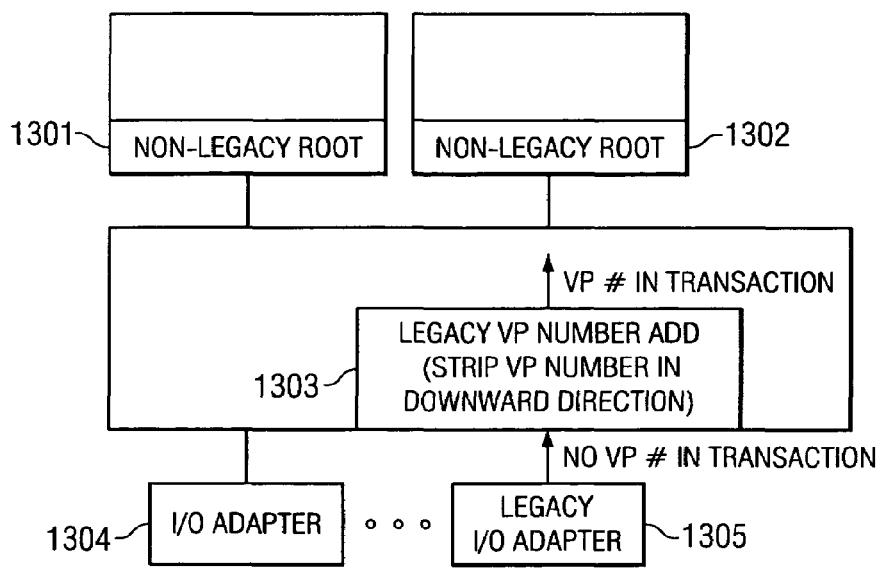
FIG. 13 depicts how a legacy I/O adapter (IOA), which does not support VPs, may be supported in accordance with an illustrative embodiment of the present invention.

FIG. 13 depicts how a legacy IOA, which does not support VPs, may be supported in accordance with an illustrative embodiment of the present invention. In such a configuration, non-legacy root complexes 1301 that do support VPs may also be supported. Shown here, root complexes 1301 and 1302 will support VPs, but also may be legacy as in FIG. 12.

The key here is that all operations from legacy IOA 1305 are assigned to the same VP number. So, as the operation from legacy IOA 1305 passes through translation logic 1303, the legacy VP number, which is held in a register in the hardware and which has been set by the same software configuration manager that assigns VP numbers to other device functions (that is, which sets up the VFPH map), gets attached to the transaction from legacy IOA 1305. In the downward direction, the transaction gets routed via the VP number and base address registers to translation logic 1303, which then proceeds to strip the VP number from the transaction before passing it on to legacy IOA 1305.

In summary, the aspects of present invention provide a, method, apparatus, and computer usable medium for providing each root node of a multiple root node system, its own independent address space. This same mechanism will also allow multiple system images within the same root node to have their own independent address spaces. The embodiments of the present invention further provide a mechanism for incorporating legacy root node and input/output (I/O) adapters that are non-aware of the mechanisms introduced by this invention. I/O adapters which implement this invention may also have the number of functions that they support greatly expanded beyond the present eight functions per I/O adapter (IOA).

The invention may take the form of an entirely hardware embodiment or an embodiment containing both hardware and software elements. In a preferred embodiment, the invention is implemented in hardware and software, which includes but is not limited to firmware, resident software, microcode, etc.

Furthermore, aspects of the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing address spaces in shared input/output fabrics, the method comprising:

receiving a legacy transaction from a particular device of a plurality of legacy devices in the shared input/output fabric;

determining if the legacy transaction is a configuration transaction; in response to the legacy transaction being a configuration transaction, determining if a bus number and a device number associated with the legacy transaction belong to the particular device;

in response to the bus number and the device number belonging to another device, passing the legacy transaction on to a next level of the shared input/output fabric;

in response to the bus number and the device number belonging to the particular device, determining if the legacy transaction is an access by a unique address plane in a plurality of planes;

in response to the legacy transaction being an access from a plane other than the unique address plane, identifying a pointer to an appropriate peripheral component interconnect header to form an identified pointer, wherein the identified pointer is determined using a virtual plane number and function number associated with the legacy transaction, wherein the virtual plane number and function number define the identified pointer in a virtual function number to physical header map;

further in response to the legacy transaction being an access from a plane other than the unique address plane, processing the legacy transaction using the identified pointer;

in response to the legacy transaction being an access from the unique address plane, providing access to a first eight function numbers;

further in response to the legacy transaction being an access from the unique address plane, processing the legacy transaction using the function number from the identification information;

in response to the legacy transaction not being a configuration transaction, determining the routing of the legacy transaction, wherein the routing is determined using a virtual plane number and a single or a plurality of base address registers associated with the virtual plane number;

further in response to the legacy transaction not being a configuration transaction, processing the legacy transaction using the routing, wherein the legacy transaction is a memory mapped I/O operation or a direct memory access operation;

responding to the particular device using a virtual plane number and a requestor identification information from the legacy transaction in a response transaction;

routing the response transaction using the virtual plane number and the requestor identification information.

* * * * *